US012605796B1

(12) United States Patent
McCoy et al.

(10) Patent No.: US 12,605,796 B1
(45) Date of Patent: Apr. 21, 2026

(54) SUBSTRATE HOLDER

(71) Applicant: Yield Engineering Systems, Inc.,
Fremont, CA (US)

(72) Inventors: Craig W. McCoy, San Jose, CA (US);
Christopher T. Lane, Fremont, CA
(US)

(73) Assignee: Yield Engineering Systems, Inc.,
Fremont, CA (US)

( * ) Notice: Subject to any disclaimer, the term of this
patent is extended or adjusted under 35
U.S.C. 154(b) by 0 days.

(21) Appl. No.: 19/255,627

(22) Filed: Jun. 30, 2025

(51) Int. Cl.
B23Q 3/06 (2006.01)

(52) U.S. Cl.
CPC ............. B23Q 3/061 (2013.01); B23Q 3/062
(2013.01); *B23Q 2703/12* (2013.01)

(58) Field of Classification Search
CPC .......... B25B 5/14; B25B 5/145; B25B 11/00;
C23C 14/50; H01L 21/67303; H01L
21/67309; H01L 21/67313; H01L
21/6732; H01L 21/67326; H01L
21/67346; H01L 21/67383; H01L 21/67
See application file for complete search history.

(56) References Cited

U.S. PATENT DOCUMENTS

| | | | | |
|---|---|---|---|---|
| 5,603,777 | A * | 2/1997 | Ohashi | H01L 21/67712 |
| | | | | 414/940 |
| 8,601,651 | B2 * | 12/2013 | Christen | B62B 3/108 |
| | | | | 269/92 |
| 2017/0323815 | A1 * | 11/2017 | Kuenanz | H01L 21/67346 |
| 2019/0376177 | A1 * | 12/2019 | Butler | C23C 14/505 |

FOREIGN PATENT DOCUMENTS

TW          M602806  U     10/2020

OTHER PUBLICATIONS

International Search Report and Written Opinion in International
Application No. PCT/US2025/049812, mailed on Dec. 4, 2025, 10
pages.

* cited by examiner

*Primary Examiner* — Tyrone V Hall, Jr.
(74) *Attorney, Agent, or Firm* — Fish & Richardson P.C.

(57) ABSTRACT

An apparatus that includes a holder body configured to hold
a substrate at edge portions of the substrate. The holder body
includes a first layer and a second layer parallel to the first
layer, forming a slot between the two layers to receive the
substrate. The apparatus further includes one or more detent
rotational locking mechanisms attached to the holder body.
The apparatus further includes one or more bar leaves
positioned within the slot and attached to the one or more
detent rotational locking mechanisms. The one or more
detent rotational locking mechanisms are configured to
provide a clamping force to hold the substrate positioned
between the one or more bar leaves and the holder body.

20 Claims, 5 Drawing Sheets

SUBSTRATE HOLDER

TECHNICAL FIELD

The present disclosure generally relates to a substrate holder.

BACKGROUND

In semiconductor processing, a substrate holder is used to securely hold a semiconductor substrate for safe transport between or within equipment through various stages of device fabrication.

SUMMARY

Implementations of the present disclosure are directed to a substrate holder (also referred to simply as a holder) to securely hold various types of substrates, e.g., amorphous or copper clad laminate (CCL) substrates, with an appropriate level of clamping force without damaging the substrate. The holder can have a body configured to hold a substrate at edge portions of the substrate positioned within a slot formed by two layers of the body. The substrate can be held using one or more bar leaves positioned within the slot, where one or more detent rotational locking mechanisms attached to the body can securely lock the position of the substrate through the bar leaves. The substrate holder can be integrated as a part of a processing equipment that performs shock activation, agitation (e.g., in X, Y and Z directions), or dynamic flow processing, and the clamping force can be sufficient to hold the substrate during these types of processing, e.g., acceleration up to 20 G.

An implementation of this disclosure provides an apparatus. The apparatus includes a holder body configured to hold a substrate at edge portions of the substrate. The holder body includes a first layer and a second layer parallel to the first layer, forming a slot between the two layers to receive the substrate. The apparatus further includes one or more detent rotational locking mechanisms attached to the holder body. The apparatus further includes one or more bar leaves positioned within the slot and attached to the one or more detent rotational locking mechanisms. The one or more detent rotational locking mechanisms are configured to provide a clamping force to hold the substrate positioned between the one or more bar leaves and the holder body.

In an aspect, the holder body includes three sides, where each of the three sides is shaped to receive a side of the substrate.

In an aspect, a first side and a second side of the three sides are parallel and a third side of the three sides is perpendicular to the first and second sides.

In an aspect, the one or more detent rotational locking mechanisms includes one or more first detent rotational locking mechanisms attached to the first side and one or more second detent rotational locking mechanisms attached to the second side. The one or more bar leaves includes one or more first bar leaves attached to the one or more first detent rotational locking mechanisms and one or more second bar leaves attached to the one or more second detent rotational locking mechanisms.

In an aspect, combinable with any other aspect, the first layer includes a plurality of holes, and each of the one or more detent rotational locking mechanisms is coupled to the first layer using a respective individual hole of the plurality of holes.

In an aspect, combinable with any other aspect, the one or more detent rotational locking mechanisms includes one or more respective springs.

In an aspect, combinable with any other aspect, the clamping force is between 60 newton (N) and 70 N.

In an aspect, combinable with any other aspect, the holder body includes polyether ether ketone (PEEK).

In an aspect, combinable with any other aspect, the bar leaf includes PEEK or polyphenylene sulfide (PPS).

In an aspect, combinable with any other aspect, the apparatus further includes one or more first elastomeric buttons coupled to the one or more bar leaves. The apparatus further includes one or more second elastomeric buttons coupled to the holder body. The one or more first and second elastomeric buttons are positioned to hold opposite surfaces of the substrate positioned between the one or more bar leaves and the holder body.

In an aspect, the one or more detent rotational locking mechanisms are coupled to the first layer of the holder body, and the one or more second elastomeric buttons are coupled to the second layer of the holder body.

In an aspect, the elastomeric buttons include perfluoroelastomer (FFKM), fluorocarbon rubber (FKM), or silicon.

In an aspect, combinable with any other aspect, the holder body includes one or more hooks at one or more corners of the holder body, the one or more hooks configured to hang the holder body vertically.

Another implementation of this disclosure provides a substrate holder. The substrate holder includes a holder body including three bars connected to form a U-shape with three sides, two of the three sides being parallel, the other of the three sides being perpendicular to the two of the three sides, each side including a first layer and a second layer, forming a slot between the two layers to receive a square-shaped substrate. The substrate holder further includes one or more first detent rotational locking mechanisms attached to a first side of the two of the three sides of the holder body, on the first layer. The substrate holder further includes one or more second detent rotational locking mechanisms attached to a second side of the two of the three sides of the holder body, on the first layer. The substrate holder further includes one or more first bar leaves attached to the one or more first detent rotational locking mechanisms, the one or more first bar leaves being inside the slot, the one or more first bar leaves including one or more first top elastomeric buttons. The substrate holder further includes one or more second bar leaves attached to the one or more second detent rotational locking mechanisms, the one or more second bar leaves being inside the slot, the one or more second bar leaves including one or more second top elastomeric buttons. The one or more first detent rotational locking mechanisms and the one or more second detent rotational locking mechanisms are configured to provide a clamping force to hold the square-shaped substrate.

In an aspect, the substrate holder further includes one or more bottom elastomeric buttons disposed on the two of the three sides of the holder body, on the second layer.

In an aspect, combinable with any other aspect, the one or more first bar leaves and the one or more second bar leaves have a length substantially same with a side of the holder body.

In an aspect, combinable with any other aspect, a side of the holder body is from 100 mm to 600 mm.

Another implementation of this disclosure provides a system for wet processing a substrate. The system includes a vessel filled with a treatment fluid, and a plurality of substrate holders. Each substrate holder includes a holder body configured to hold a substrate at edge portions of the substrate. The holder body includes a first layer and a second layer parallel to the first layer, forming a slot between the two layers to receive the substrate. Each substrate holder further includes one or more detent rotational locking mechanisms attached to the holder body. Each substrate holder further includes one or more bar leaves inside the slot, attached to the one or more detent rotational locking mechanisms. Each substrate holder further includes one or more first elastomeric buttons disposed on the one or more bar leaves. Each substrate holder further includes one or more second elastomeric buttons disposed on the holder body. The one or more first elastomeric buttons and the one or more second elastomeric buttons are positioned to hold opposite sides of the substrate respectively. The one or more detent rotational locking mechanisms are configured to provide a clamping force to hold the substrate positioned between the one or more first elastomeric buttons and the one or more second elastomeric buttons through the one or more bar leaves. The system further includes an agitation mechanism to provide motions to the plurality of substrate holders.

In an aspect, the holder body includes a plurality of holes that are configured to enable the treatment fluid to flow through the plurality of holes.

In an aspect, combinable with any other aspect, the agitation mechanism is configured to agitate the plurality of substrate holders with acceleration up to 20 G, and the clamping force is large enough to hold the substrate in a fixed position relative to the substrate holder at acceleration of 20 G.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Various aspects of this disclosure describe a substrate holder. Generally, semiconductor devices are fabricated on substrates, and in various stages of fabrication, the substrates are held by one or more substrate holders during the processing. Such processing includes dry and/or wet processes, such as plasma etching, ion implantation, cleaning, surface preparations, and deposition (e.g., electrochemical deposition or electroless deposition). These processes can be static, e.g., static dry process, or dynamic or active, e.g., controlled speed insertion bath immersion process. For these applications, conventional substrate holders typically rely on "floating" containment with no discernable applied load (force) to substrate. However, such designs may not be suited for processes involving shock activation, agitation, or dynamic flow applications.

In various implementations, a substrate holder as disclosed herein is designed to have one or more clamping mechanisms and be compatible with such applications. With the integration of secure clamping, one or more substrates held by the holder can be agitated in any direction with acceleration up to 20 G without causing any damage to the substrates. In some implementations, a pliable clamping force is realized with a minimal amount of material and space to allow a cleaning or process fluid to flow uniformly over the working surfaces of the substrate. The substrates can include borosilicate glass panel substrates, or amorphous or copper clad laminate (CCL) substrates, which can be used for manufacturing printed circuit boards (PCBs) upon which electronic components are mounted and interconnected.

The substrate holder as described herein can ensure precise positioning and stability, which facilitates uniform treatment conditions while preventing contamination. In some implementations, one such substrate holder is made of materials resistant to chemicals and high temperatures, while maintaining the capability to hold the substrate securely.

In the following sections, the substrate holder of this disclosure is described referring to FIG. 1. Specific components and designs of the substrate holder that enables clamping are further described referring to FIGS. 2-6. A process equipment that includes multiple substrate holders and is configured to perform a dynamic process with agitation is then described referring to FIG. 7.

Figure 1:
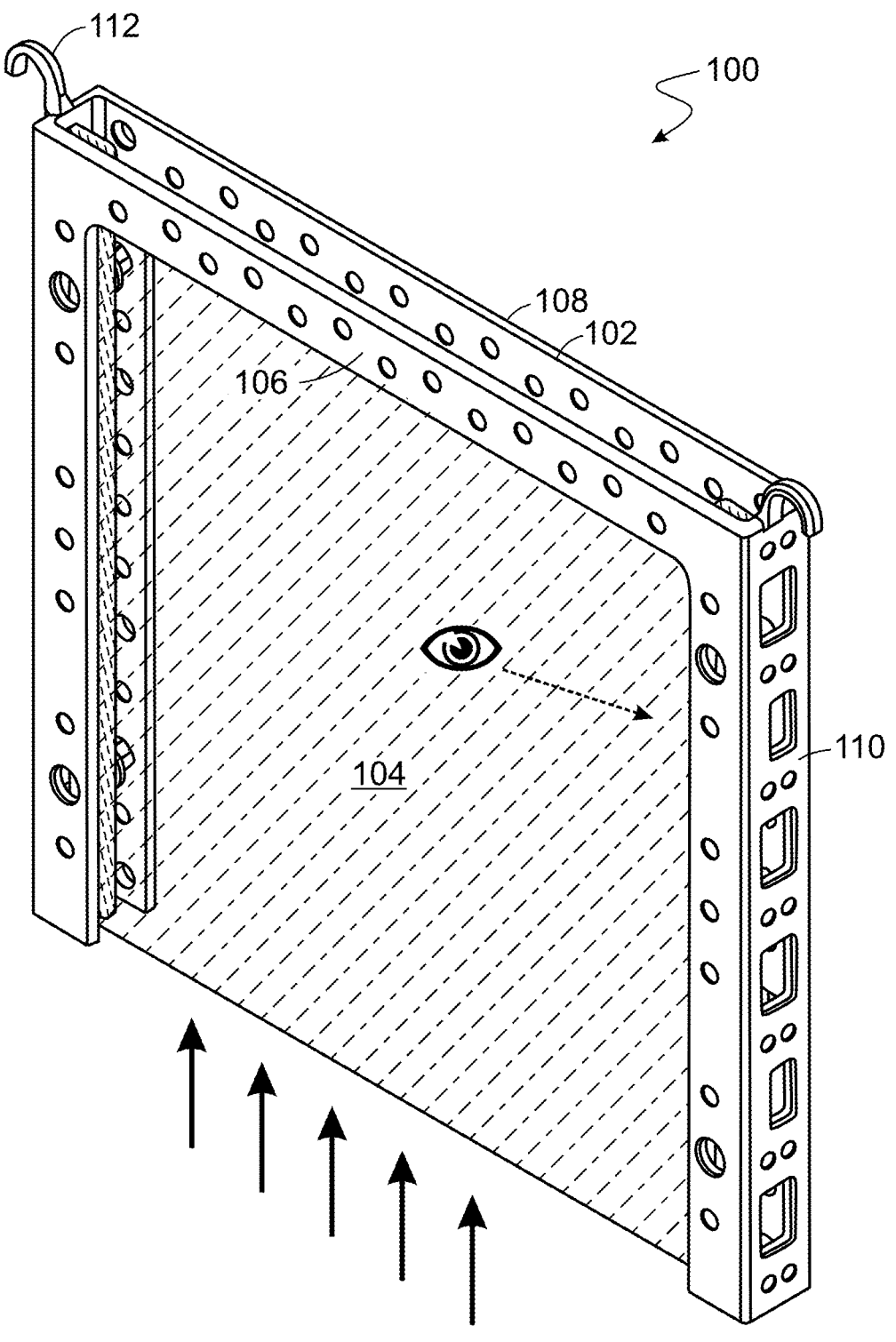
FIG. 1 shows a perspective view of a substrate holder.

FIG. 1 illustrates a substrate holder 100 according to an implementation of this disclosure. The substrate holder 100 includes a holder body 102 configured to hold a substrate 104 at edge portions of the substrate 104. In various implementations, the holder body 102 comprises a first layer 106 and a second layer 108 parallel to the first layer 106, forming a slot between the two layers. The substrate 104 can be positioned within the slot and secured by a clamping mechanism as further described below in later sections.

As illustrated in FIG. 1, the holder body 102 can be a single piece of material with the two layers facing to each other with a gap to form the slot. In some implementations, the two layers are bridged by one or more side walls 110. The width of the side walls 110 can define the thickness of the holder body 102 and the slot height. The slot height can be selected in view of the thickness of the substrate 104. In various implementations, the substrate 104 has a thickness from about 0.7 mm to about 2.0 mm.

The holder body 102 can be made of materials chemically and thermally stable during the intended fabrication/cleaning processes for the substrate 104. In some implementations, the holder body 102 is made of metals, e.g., stainless steel or titanium. In some implementations, the holder body 102 is made of high-performance thermoplastic polymer, e.g., polyether ether ketone (PEEK). Further, the holder body 102 can include a composited material of more than one type of materials.

As illustrated in FIG. 1, the holder body 102 can have a U-shape with three sides. In various implementations, the holder body 102 is shaped to receive a square-shaped substrate (e.g., the substrate 104). Each of the three sides can be shaped to receive a side of the square-shaped substrate. Accordingly, in some implementations, the first side and the second side of the three sides are parallel and the third side of the three sides is perpendicular to the first and second sides. Further, in some implementations, the U-shape of the holder body 102 is designed such that the substrate 104 can be inserted from an open end into the slot as indicated a set of solid arrows in FIG. 1. In such implementations, the first and second sides of the holder body 102 can include the side walls 110, while the third side can omit a side wall to enhance fluid flow.

The holder body 102 can be sized and shaped according to the size of the substrate 104. In some implementations, the substrate 104 has a side length from about 100 mm to about 600 mm. For example, the side of the substrate 104 can be from about 100 mm to about 400 mm, from about 100 mm to about 200 mm, from about 300 mm to about 600 mm, or from about 500 mm to about 600 mm. In some implementations, the substrate 104 has a dimension of about 600 mm×600 mm. In some implementations, the substrate 104 has a dimension of about 255 mm×258 mm.

While FIG. 1 illustrates a U-shaped holder body, in other implementations, the holder body 102 can have a different shape. Further, the holder body 102 can include more than one body parts. For example, the holder body 102 can include a set of two straight bars, where each bar is configured to hold only two opposite sides of the substrates 104, instead of three sides held by the U-shaped holder body. In some implementations, the substrate 104 has a shape other than a square, and the holder body 102 can be shaped to accommodate the shape of the substrate 104.

In various implementations, the holder body 102 further includes one or more hooks 112 configured to hand the substrate holder 100 vertically. As illustrated in FIG. 1, the hooks 112 can be positioned at one or more corners of the holder body 102, at the end of the side wall 110.

In some implementations, the holder body 102 is perforated. The perforation can reduce the material used. Further, the holes by perforation can also allow a process or cleaning fluid to flow with less resistance and improve the contact with the working surfaces of the substrate 104 in case of wet processing. As illustrated in FIG. 1, the shape and size of holes can vary. In some implementations, as further described below, some of the holes can be used to fix additional components of the substrate holder 100 such as a detent locking mechanism.

Figure 2:
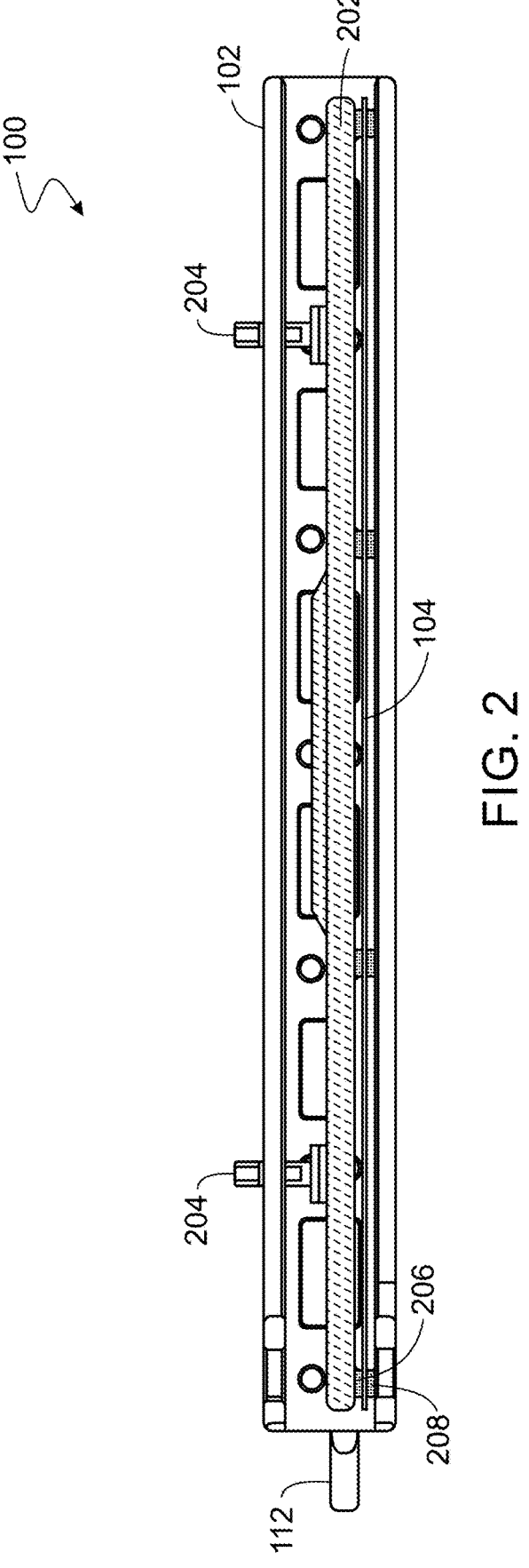
FIG. 2 shows a side view of a section of the substrate holder of FIG. 1.
Figure 3:
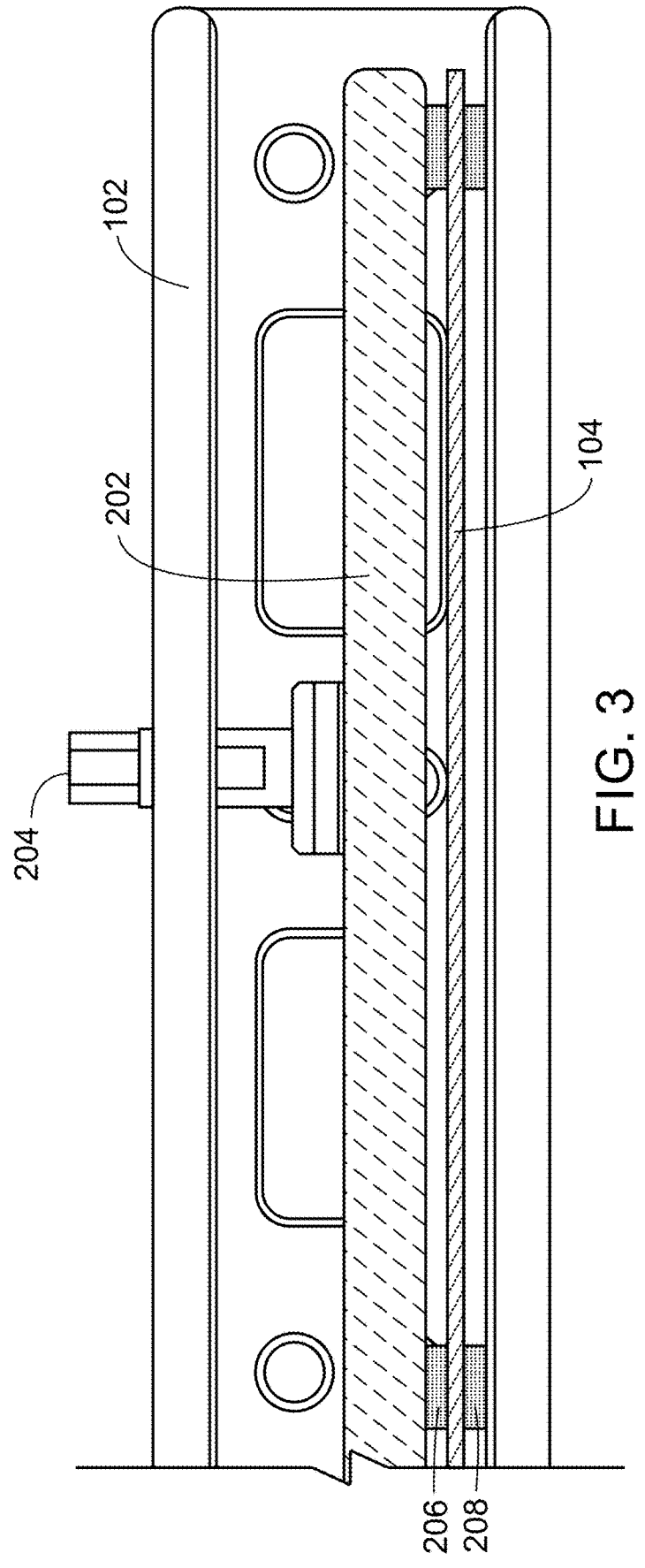
FIG. 3 shows an enlarged view of a section of the substrate holder as shown in FIG. 2.

FIGS. 2-3 show side views of sections of the substrate holder 100 of FIG. 1, where FIG. 3 is an enlarged view of FIG. 2. The dotted arrow in FIG. 1 indicates the viewing angle for FIGS. 2-3. As illustrated in FIGS. 2-3, the clamping mechanism of the substrate holder 100 is based on an assembly of components such as a bar leaf 202 in the slot and a detent locking mechanism 204. Additional illustrations of the clamping mechanisms are provided as FIG. 4-6.

The bar leaf 202 serves a medium to uniformly transfer a clamping force from the holder body 102 and the detent locking mechanism 204 to the substrate 104. FIGS. 2-3 shows only a side of the holder body 102 and correspondingly one bar leaf 202 is illustrated. In various implementations, the substrate holder 100 includes more than one bar leaf 202 to provide the clamping force at more than one side of the substrates 104, e.g., the opposite two sides of the substrate 104. The design and locations of the bar leaves 202 can accordingly be selected to distribute the clamping force evenly across the substrate 104 for secure clamping and avoid damage to the substrate 104. In some implementations, first detent rotational locking mechanisms are attached to the first side of the holder body 102 and second detent rotational locking mechanisms are attached to the opposite side of the holder body 102.

Figure 4:
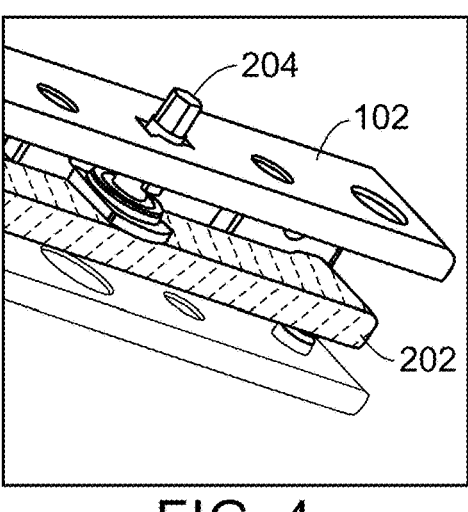
FIG. 4 shows a perspective view of a clamping mechanism of the substrate holder of FIG. 1.

In various implementations, the bar leaf 202 have a length substantially same with a side of the holder body 102. Alternately, the bar leaf 202 can be slightly shorter such that it can be housed inside the slot. The bar leaf 202 can have a width not larger than that of the side of the holder body 102, thus not extending out of the holder body 102 as seen in FIG. 4.

The bar leaf 202 can be made of materials chemically and thermally stable during the intended fabrication/cleaning processes for the substrate 104. In various implementations, the bar leaf 202 is made of high-performance thermoplastic polymer such as PEEK or polyphenylene sulfide (PPS).

As further illustrated in FIGS. 2-3, the substrate holder 100 can include one or more detent locking mechanisms 204. The detent locking mechanisms can be attached to the holder body 102 on one end and the bar leaf 202 on another end. The detent locking mechanisms 204 are configured to lock and unlock the position of the bar leaf 202 and accordingly the substrate 104. When it is unlocked (released), the bar leaf 202 can be lifted within the slot to create a space for the substrate 104 to slide, allowing the substrate 104 to be inserted into the slot or removed from it. When in the locked position, the detent locking mechanisms 204 fix the position of the bar leaf 202 relative to the holder body 102. In some implementations, the detent locking mechanisms 204 are configured to allow a stepwise locking feature with more than two settings, e.g., locked, semi-locked, and unlocked. With the stepwise locking feature, a user can adjust the level of clamping according to the thickness, material, or strength of the substrate 104.

Figure 5:
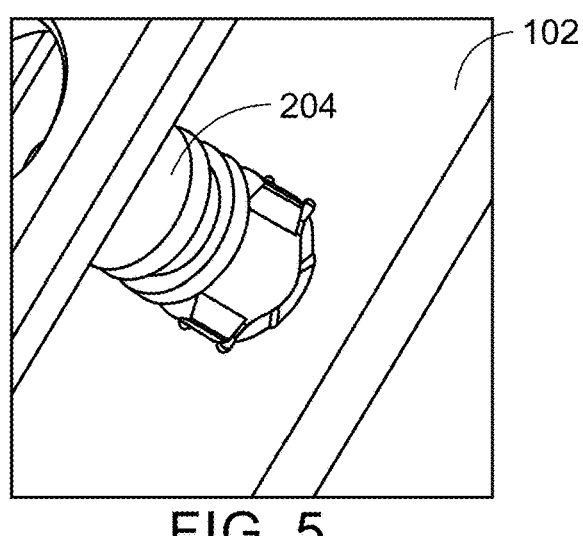
FIG. 5 shows a detent rotational locking mechanism.
Figure 6:
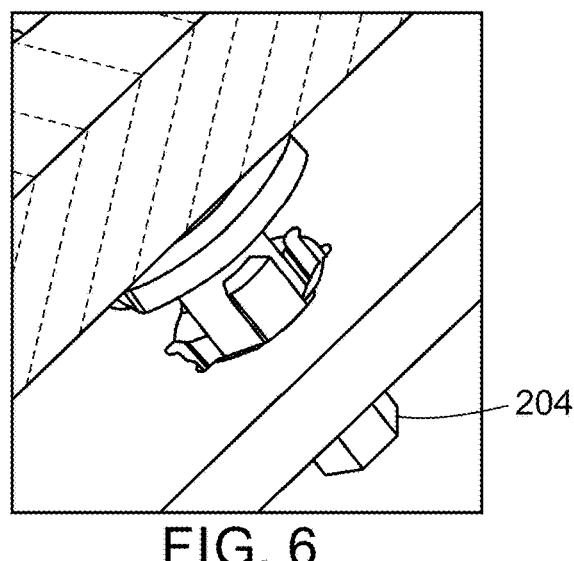
FIG. 6 shows a detent rotational locking mechanism attached to a bar leaf.

In various implementations, the detent locking mechanisms 204 are based on rotational locking mechanisms (FIGS. 5-6). In some implementations, the detent locking mechanisms 204 includes one or more respective springs. This locking mechanism can involve a spring-loaded ball or pin that fits into a corresponding notch or groove to provide a secure hold. Examples of detent locking mechanisms include but are not limited to ball detents, pin detents, and positive locking detent.

In some implementations, as illustrated in FIGS. 2-6, the holder body 102 is perforated and includes multiple holes on at least one of the two layers. The detent locking mechanisms 204 can be coupled to the one of the layers using a respective individual hole.

In various implementations, the maximum clamping force applied is between about 60 newton (N) and 70 N, e.g., from about 66.8 N to about 68.7 N (corresponding to exerting a weight of about 6.8-7.0 kg). In some implementations, the clamping force can be selected to securely hold the substrate 104, e.g., a glass substrate, but avoid any flexural cracking. Although not specifically illustrated, in various implementations, the clamping mechanism of the substrate holder 100 can further include one or more sensors to monitor the clamping force applied to the substrate 104. In some implementations, the clamping mechanism is at least in part automated with sensors and a controller, where real-time monitoring of clamping force can be used to adjust the manipulation of the detent locking mechanisms 204 and accordingly the applied force.

While two detent locking mechanisms 204 are illustrated in FIG. 2, the number of detent locking mechanisms 204 per holder body 102 or per side of the holder body 102 is not limited to any number. For example, three or more detent locking mechanisms 204 can be disposed on one or more sides of the holder body 102. Further, referring back to FIG. 1, where the holder body 102 has a U-shape with three sides, it is possible to install detent locking mechanisms 204 only to two opposite sides or all three sides. The number and locations of the detent locking mechanisms 204 can be selected to distribute the clamping force evenly across the substrate 104 for secure clamping and avoid damage to the substrate 104. For example, the detent locking mechanisms 204 can be positioned with equal distance to each other on the sides of the holder body 102.

In various implementations, the number and locations of bar leaves 202 are determined based on the locations of the detent locking mechanisms 204. In some implementations, each of two parallel sides of the U-shaped holder body 102 can include one set of the detent locking mechanisms 204 and one or more bar leaves 202.

Referring back to FIGS. 2-3, the substrate holder 100 further includes top elastomeric buttons 206 coupled to the bar leaf 202 at the bottom side of the bar leaf 202. The substrate holder 100 can further include bottom elastomeric buttons 208 coupled to the holder body 102.

The top and bottom elastomeric buttons can be positioned to hold opposite surfaces of the substrate 104 positioned between the bar leaf 202 and the holder body 102. The top and bottom elastomeric buttons can prevent slippage of the substrate 104. In various implementations, the detent locking mechanisms 204 are coupled to the first layer of the holder body 102, and the bottom elastomeric buttons are coupled to the second layer of the holder body 102. As illustrated in FIGS. 2-3, the detent locking mechanisms 204 and the top elastomeric buttons 206 can be positioned on the opposite sides (top side and bottom side, respectively) of the bar leaf 202.

In various implementations, the elastomeric buttons are made of perfluoroelastomer (FFKM). Examples of FFKM include but are not limited to Kalrez®, Chemraz®, Markez®, and Eztra®, Perlast®, and Kyflon®. In some implementations, other materials such as fluorocarbon rubber (FKM) or silicon-based materials can also be used for the elastomeric buttons.

In some implementations, the top and bottom elastomeric buttons are the only points of contact with the substrate 104. While four sets of elastomeric buttons 206, 208 are illustrated in FIG. 2, the number of elastomeric buttons per bar leaf 202 is not limited to any number. For example, there or less, or five or more, sets of elastomeric buttons can be provided per bar leaf. In various implementations, the number and locations of elastomeric buttons are determined based on the types of substrate and process conditions involving agitations. Further, in some implementations, the elastomeric buttons can be distributed evenly with equal distance to each other on the bar leaf 202.

Figure 7:
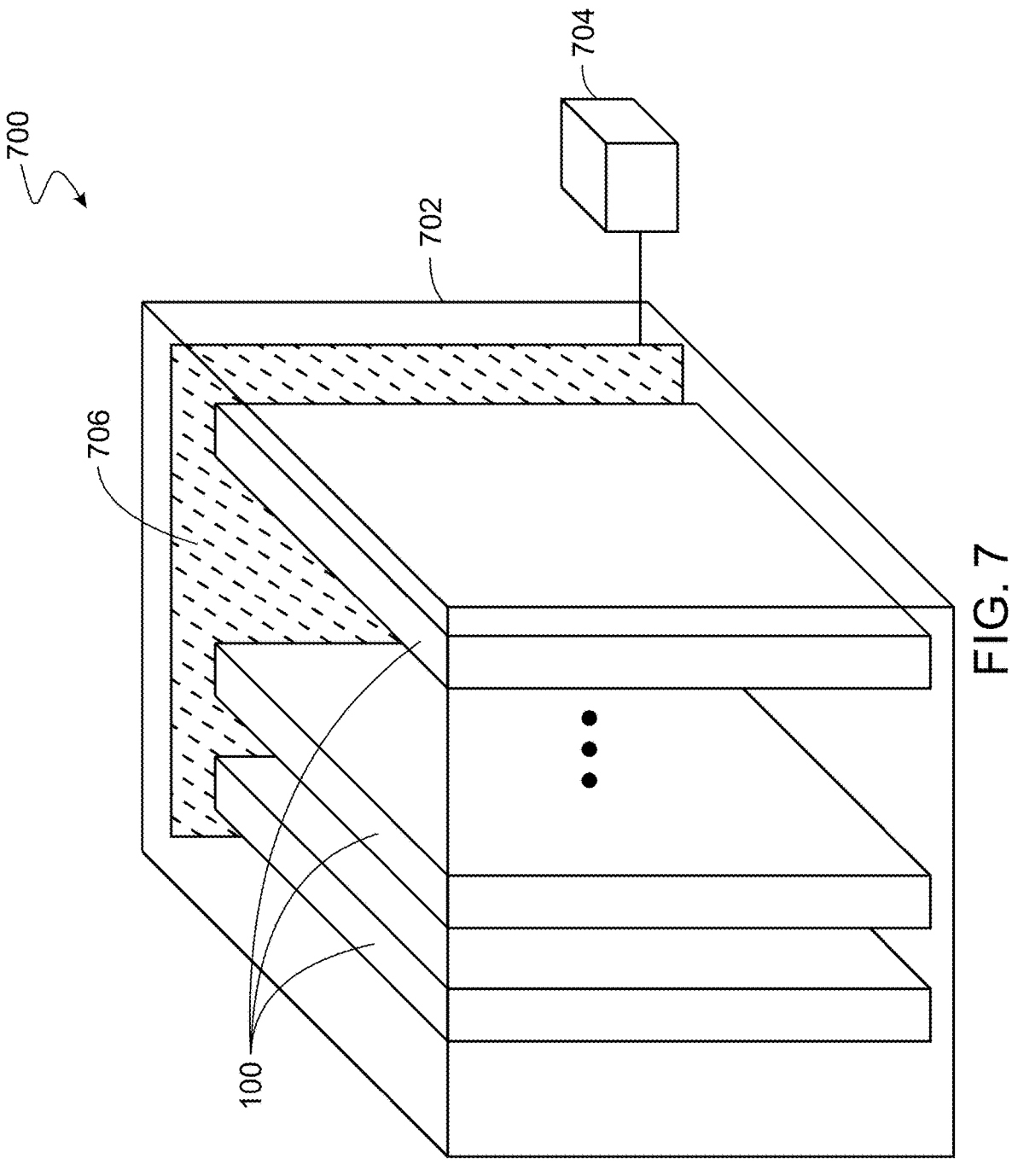
FIG. 7 shows a schematic of a substrate processing system including multiple substrate holders.

The substrate holder described above in various implementations can be integrated as a part of a processing equipment. In some implementations, the processing equipment is configured to process multiple substrates at once, and accordingly includes multiple substrate holder. FIG. 7 shows a schematic of a substrate processing system 700 including multiple substrate holders 100. The design of each of the substrate holders 100 can be the same as those described previously referring to FIGS. 1-6, and thus will not be repeated.

In various implementations, the substrate processing system 700 is configured to perform a wet process that involves treating the substrates with a treatment fluid, e.g., a chemical treatment fluid or a cleaning fluid. As illustrated in FIG. 7, the substrate processing system 700 can include a vessel 702 to contain the treatment fluid and house the multiple substrate holders 100. In some implementations, the substrate holders are positioned vertically and aligned parallel to each other with some gaps in between. Further, the substrate processing system 700 can include a controller 704 and an agitation mechanism 706.

In the processing and cleaning of substrates such as CCL substrates, agitation can help improve the uniformity of treatment and prevent sedimentation. During stages such as cleaning, etching, and plating, agitation helps to evenly distribute chemicals, removing tripped air bubbles, and maintain consistent temperatures. In various implementations, the agitation mechanism 706 includes electric motors, which rotate a shaft at specific speeds to achieve the desired level of agitation. In some implementations, the agitation mechanism 706 provides acceleration up to 20 G. Each of the substrate holder 100 can offer the clamping force large enough to hold the substrate in a fixed position relative to the substrate holder at acceleration of 20 G.

In various implementations, the controller 704 is understood to be one or more computing systems connected to one or more components of the substrate processing system 700 to receive signals indicative of physical parameters of substrate processing system 700, e.g., flow rates, agitation rate, temperature(s), and/or the like, and to send signals that control elements of the substrate processing system 700. For example, the controller 704 can send signals to the agitation mechanism 706 to perform agitation at a certain acceleration rate or frequency. The controller 704 can include one or more computing systems local to and/or remote from other components of the substrate processing system 700.

In some implementations, the controller 704 includes a computing system. The term "computing system" as used in this disclosure may encompass all apparatus, devices, and machines for processing data, including by way of example a programmable processor, a computer, or multiple processors or computers. A computing system, such as the controller 704, can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, executable logic, or code, can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a generalpurpose computer, and sometimes it is a custom-tailored special purpose electronic device, and sometimes it is a combination of these things.

Implementations can include a back-end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. An apparatus comprising:
a holder body configured to hold a substrate at edge portions of the substrate, the holder body comprising a first layer and a second layer parallel to the first layer, the first and the second layers facing each other with a fixed intervening gap forming a slot between the two layers to receive the substrate, the first and the second layers bridged by at least one side wall;
one or more detent rotational locking mechanisms attached to the first layer of the holder body; and
one or more bar leaves movably positioned between the first and the second layers within the slot, attached to the one or more detent rotational locking mechanisms, and configured to hold the substrate between the one or more bar leaves and the second layer of the holder body by adjusting a position of the one or more bar leaves within the slot;
wherein the one or more detent rotational locking mechanisms are configured to provide a clamping force to hold the substrate.

2. The apparatus of claim 1, wherein the holder body comprises three sides, each of the three sides shaped to receive a side of the substrate.

3. The apparatus of claim 2, wherein a first side and a second side of the three sides are parallel and a third side of the three sides is perpendicular to the first and second sides.

4. The apparatus of claim 3, wherein
the one or more detent rotational locking mechanisms comprises one or more first detent rotational locking mechanisms attached to the first side and one or more second detent rotational locking mechanisms attached to the second side,
the one or more bar leaves comprises one or more first bar leaves attached to the one or more first detent rotational locking mechanisms and one or more second bar leaves attached to the one or more second detent rotational locking mechanisms.

5. The apparatus of claim 1, wherein the first layer comprises a plurality of holes, and each of the one or more detent rotational locking mechanisms is coupled to the first layer using a respective individual hole of the plurality of holes.

6. The apparatus of claim 1, wherein the one or more detent rotational locking mechanisms comprises one or more respective springs.

7. The apparatus of claim 1, wherein the clamping force is between 60 newton (N) and 70 N.

8. The apparatus of claim 1, wherein the holder body comprises polyether ether ketone (PEEK).

9. The apparatus of claim 1, wherein the bar leaf comprises PEEK or polyphenylene sulfide (PPS).

10. The apparatus of claim 1, further comprising:
one or more first elastomeric buttons coupled to the one or more bar leaves; and
one or more second elastomeric buttons coupled to the holder body,
wherein the one or more first and second elastomeric buttons are positioned to hold opposite surfaces of the substrate positioned between the one or more bar leaves and the holder body.

11. The apparatus of claim 10, wherein the one or more detent rotational locking mechanisms are coupled to the first layer of the holder body, and the one or more second elastomeric buttons are coupled to the second layer of the holder body.

12. The apparatus of claim 10, wherein the elastomeric buttons comprise perfluoroelastomer (FFKM), fluorocarbon rubber (FKM), or silicon.

13. The apparatus of claim 1, wherein the holder body comprises one or more hooks at one or more corners of the holder body, the one or more hooks configured to hang the holder body vertically.

14. A system for wet processing a substrate comprising:
a substrate holder comprising:
a holder body comprising three bars connected to form a U-shape with three sides, two of the three sides being parallel, the other of the three sides being perpendicular to the two of the three sides, each side comprising a first layer and a second layer facing each other with a fixed intervening gap, forming a slot between the two layers to receive a substrate, each of the two of the three sides having a side wall bridging the first layer and the second layer;
one or more first detent rotational locking mechanisms attached to a first side of the two of the three sides of the holder body, on the first layer;
one or more second detent rotational locking mechanisms attached to a second side of the two of the three sides of the holder body, on the first layer;
one or more first bar leaves movably attached to the one or more first detent rotational locking mechanisms, being inside the slot, comprising one or more first top elastomeric buttons; and

one or more second bar leaves movably attached to the one or more second detent rotational locking mechanisms, the one or more second bar leaves being inside the slot, the one or more second bar leaves comprising one or more second top elastomeric buttons, wherein (i) the one or more first detent rotational locking mechanisms and the one or more second detent rotational locking mechanisms are configured to provide a clamping force to hold the substrate by pressing the one or more first and the one or more second bar leaves toward the second layer of the holder body by adjusting positions of the one or more first and the one or more second bar leaves within the slot;

a vessel configured to house the substrate holder; and an agitation mechanism coupled to the substrate holder and configured to agitate the substrate during a wet process in the vessel, wherein the substrate is securely held by the holder body during the wet process.

15. The system of claim 14, the substrate holder further comprising one or more bottom elastomeric buttons disposed on the two of the three sides of the holder body, on the second layer.

16. The system of claim 14, wherein the one or more first bar leaves and the one or more second bar leaves have a length substantially same with a side of the holder body.

17. The system substrate holder of claim 14, wherein a side of the holder body is from 100 mm to 600 mm.

18. A system for wet processing a substrate, the system comprising:

a vessel filled with a treatment fluid;

a plurality of substrate holders, each of the plurality of holders comprising,

a holder body configured to hold a substrate at edge portions of the substrate, the holder body comprising a first layer and a second layer parallel to the first layer, forming a slot between the two layers to receive the substrate, one or more detent rotational locking mechanisms attached to the holder body, one or more bar leaves inside the slot, attached to the one or more detent rotational locking mechanisms, one or more first elastomeric buttons disposed on the one or more bar leaves, and one or more second elastomeric buttons disposed on the holder body, wherein the one or more first elastomeric buttons and the one or more second elastomeric buttons are positioned to hold opposite sides of the substrate respectively, and the one or more detent rotational locking mechanisms are configured to provide a clamping force to hold the substrate positioned between the one or more first elastomeric buttons and the one or more second elastomeric buttons through the one or more bar leaves; and an agitation mechanism to provide motions to the plurality of substrate holders.

19. The system of claim 18, wherein the holder body comprises a plurality of holes that are configured to enable the treatment fluid to flow through the plurality of holes.

20. The system of claim 18, wherein the agitation mechanism is configured to agitate the plurality of substrate holders with acceleration up to 20 G, and the clamping force is large enough to hold the substrate in a fixed position relative to the substrate holder at acceleration of 20 G.

* * * * *